United States Patent [19]

Nohara et al.

[11] 3,758,763

[45] Sept. 11, 1973

[54] METHOD OF DIGITALLY PROCESSING SINUSOIDAL AC SIGNALS

[75] Inventors: Haruo Nohara; Junichi Makino, both of Hitachi, Japan

[73] Assignee: Hitachi, Ltd., Tokyo, Japan

[22] Filed: Nov. 5, 1971

[21] Appl. No.: 196,049

[30] Foreign Application Priority Data
Nov. 9, 1970    Japan.............................. 45/97903

[52] U.S. Cl......... 235/151.31, 324/76 R, 324/78 D, 324/83 D, 324/103 R, 444/1
[51] Int. Cl. ....................... G06f 15/20, G01r 13/02
[58] Field of Search............................. 235/151.31; 324/76 R, 78 R, 78 D, 79 D, 83 D, 99 D, 103 R; 444/1; 340/248 R, 248 A, 248 B, 248 C, 421; 328/135, 151

[56] References Cited
UNITED STATES PATENTS
3,569,785    3/1971    Durbeck et al............ 235/151.31 X
3,663,956    5/1972    Purdy et al. ..................... 324/83 D

*Primary Examiner*—Charles E. Atkinson
*Assistant Examiner*—R. Stephen Dildine, Jr.
*Attorney*—Craig, Antonelli & Hill

[57] ABSTRACT

A sinusoidal ac signal is subjected to periodic sampling having a period $\Delta t$. There is made a product of one sampled value of the signal taken at a certain sampling point and another sampled value at the next sampling point apart, by an interval of time equal to the period $\Delta t$, from the previous sampling point. If the product is of negative value, a zero point of the signal must lie between the two sampling points. The zero point can equivalently be obtained by drawing a straight line passing the two sampled values. On the basis of the zero points of sinusoidal ac signals obtained in such a manner as above, the frequencies, phase differences, powers and the impedances of the associated transmission lines are obtained by means of a digital computer.

10 Claims, 24 Drawing Figures

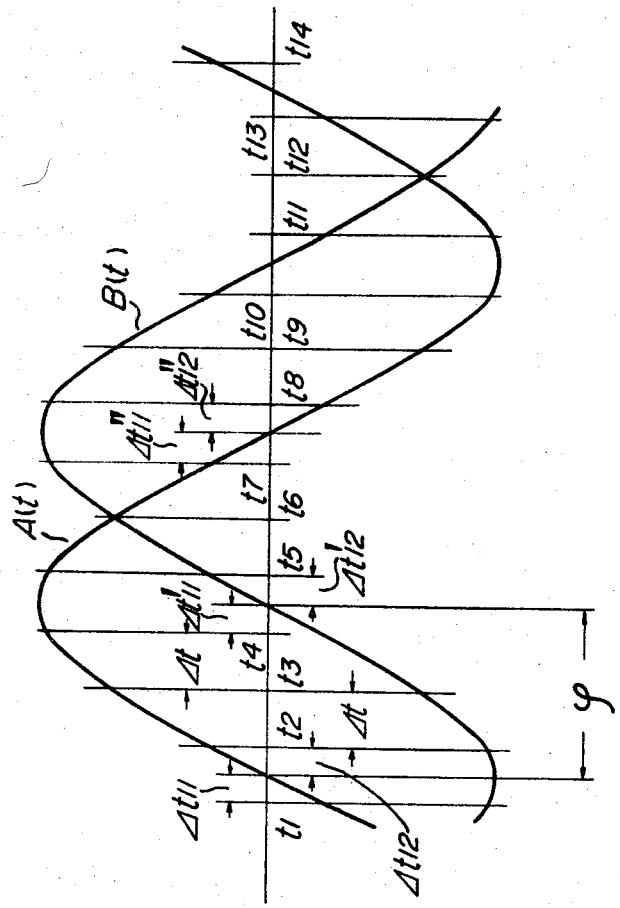

a) $A(t1) \leqq 0$, $A(t2) \geqq 0$
b) $B(t1) > 0$, $B(t2) > 0$ a) $A(t1) < 0$, $A(t2) \geqq 0$
b) $B(t1) \geqq 0$, $B(t2) < 0$
c) $\Delta t_{01} > \Delta t_{02}$ a) $A(t1) \geqq 0$, $A(t2) \leqq 0$
b) $B(t1) < 0$, $B(t2) < 0$ a) $A(t1) > 0$, $A(t2) \leqq 0$
b) $B(t1) \geqq 0$, $B(t2) < 0$
c) $\Delta t_{01} > \Delta t_{02}$ a) $A(t1)<0$, $A(t2)\geqq 0$
b) $B(t1)<0$, $B(t2)\leqq 0$
c) $\Delta to1 = \Delta to2$
[MAY NOT TO BE $\Delta to1 = \Delta to2$ IF $A(t2) = B(t2) = 0$]

a) $A(t1)>0$, $A(t2)\leqq 0$
b) $B(t1)>0$, $B(t2)\leqq 0$
c) $\Delta to1 = \Delta to2$
[MAY NOT TO BE $\Delta to1 = \Delta to2$ IF $A(t2) = B(t2) = 0$]

a) $A(t1)<0$, $A(t2)\geqq 0$ OR a) $A(t1)>0$ $A(t2)\leqq 0$
b) $B(t1)>0$, $B(t2)\leqq 0$ OR b) $B(t1)<0$ $B(t2)\geqq 0$
c) $\Delta to1 = \Delta to2$
[MAY NOT TO BE $\Delta to1 = \Delta to2$ IF $A(t2) = B(t2) = 0$]

a) $A(t_1) \equiv 0, A(t_2) \equiv 0$
b) $B(t_1) > 0, B(t_2) > 0$ a) $A(t_1) \equiv 0, A(t_2) < 0$
b) $B(t_1) < 0, B(t_2) \equiv 0$
c) $\Delta t_{01} > \Delta t_{02}$ a) $A(t_1) \equiv 0 \quad A(t_2) > 0$
b) $B(t_1) < 0 \quad B(t_2) < 0$ a) $A(t_1) < 0, A(t_2) \equiv 0$
b) $B(t_1) \equiv 0, B(t_2) < 0$
c) $\Delta t_{01} > \Delta t_{02}$

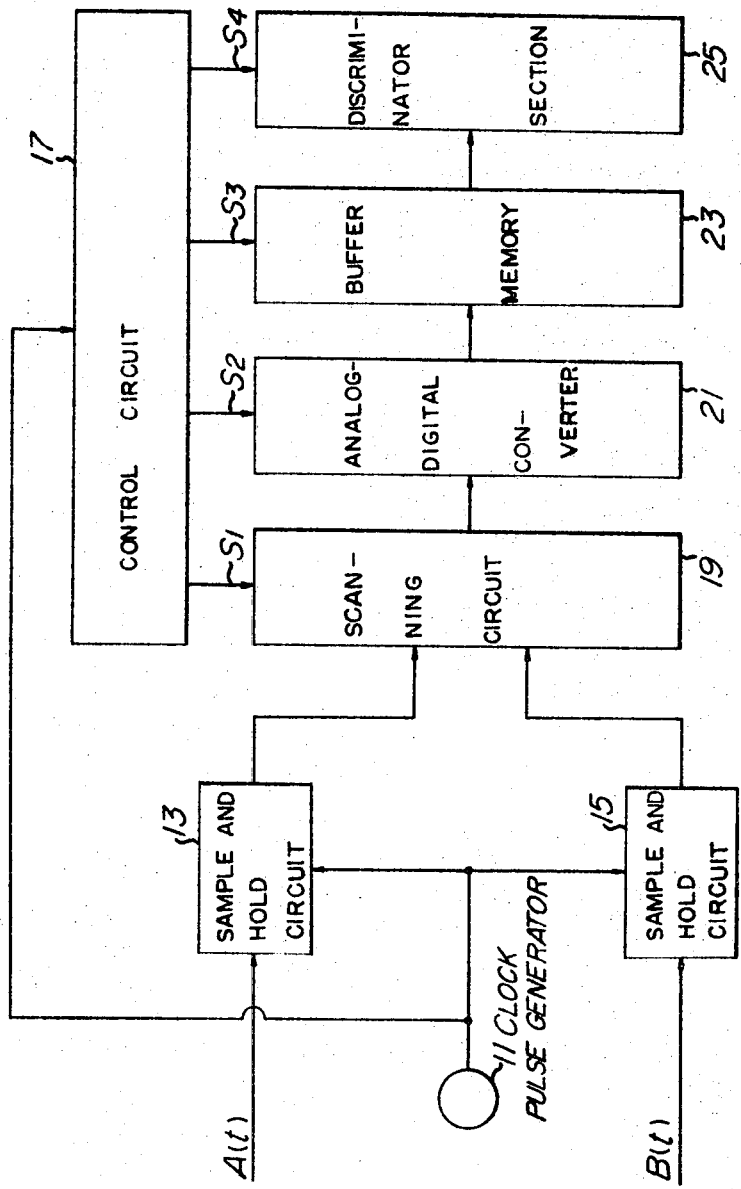

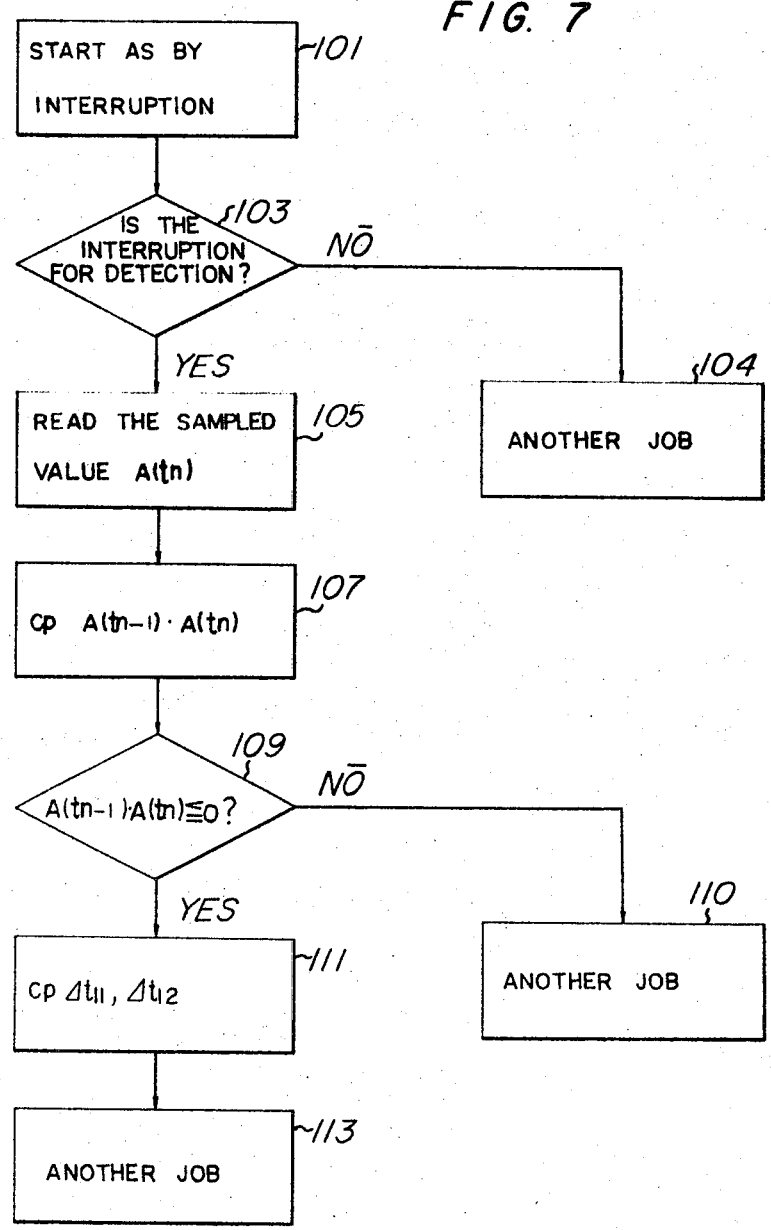

METHOD OF DIGITALLY PROCESSING SINUSOIDAL AC SIGNALS

BACKGROUND OF THE INVENTION

1. Field of the Invention

The present invention relates to a method of digitally processing sinusoidal ac signals.

2. Description of the Prior Art

A variety of faults will arise in electric power transmission systems. For example, one of them is a short-circuit between transmission lines themselves or transmission lines and the earth due to a thunderbolt. And there is a need for protecting the power transmission system from such faults. For this purpose various kinds of protective relays have been developed and in every power system a protective relay system has been employed which is considered most suitable for the type of the power transmission system.

The conventional protective relays to detect, for example, the under-voltage due to a fault, the distance to the fault or the direction of the fault are constituted of suitable analog circuits adapted for respective functions. Accordingly, a great number of such relays are needed for practical purposes. However, not only are the production costs of these relays usually high, but also there are some difficulties in checking and maintenance, thus giving rise to problems.

With the recent development of digital computors an attempt has been made to replace the protective relays by digital computors of universal use. The operational reliability is of the utmost importance for the protective relays. From the standpoint of reliability, therefore, much is expected of a digital computor which may have multiple functions, although it might still have some problems. Many experiments have been performed, some of which have been reported in IEEE. At IEEE Summer Power Meeting held on June 23 to 28 in 1968, G.D. Rockfeller announced a paper titled "Fault Protection with a Digital Computor" (Paper No. 68 TP 625-PWR), and at IEEE Summer Meeting and International Symposium on High Power Testing, held on July 18 to 23 in 1971, G.D. Rockfeller and E.A. Udren announced a paper titled "High-speed Distance Relaying Using a Digital Computor" (Paper No. 71TP567-PWR). These papers indicate that the replacement of such protective relays by a digital computor is in increasing demand.

SUMMARY OF THE INVENTION

This invention has been led from the concept that a judgement equivalent to judgement on the operation of protecting relays constituted with analogue circuits can be achieved entirely by digital computation, if the zero point (that is, a point at which the polarity of an AC quantity changes) of the input ac quantity led thereto and the magnitude of the ac quantity at a given point of time are obtained. This invention proposes a method for digitally processing an ac quantity to allow a digital computor to effectively deal with the determination of the zero-point and the input ac quantity as well as the digital computation.

According to this invention, any input ac quantity is sampled at a predetermined interval, the sampled value being multiplied, at each sampling point, by the value sampled at the last previous sampling point and if the product is a negative value, detection of the zero point is performed, the thus obtained zero point being used as the base for various digital operations and judgements and an input quantity at an arbitrary sampling point being also used for further various purposes.

BRIEF DESCRIPTION OF THE DRAWING

FIG. 3 is a wave form diagram for illustrating the invention applied especially to the detection of phase difference between two sinusoidal signals.

FIG. 5 is a block diagram showing a basic structure of one embodiment of the invention.

FIG. 7 is a flowchart drawn for the detection of the zero points of ac signals.

DESCRIPTION OF THE PREFERRED EMBODIMENT

Figure 1:
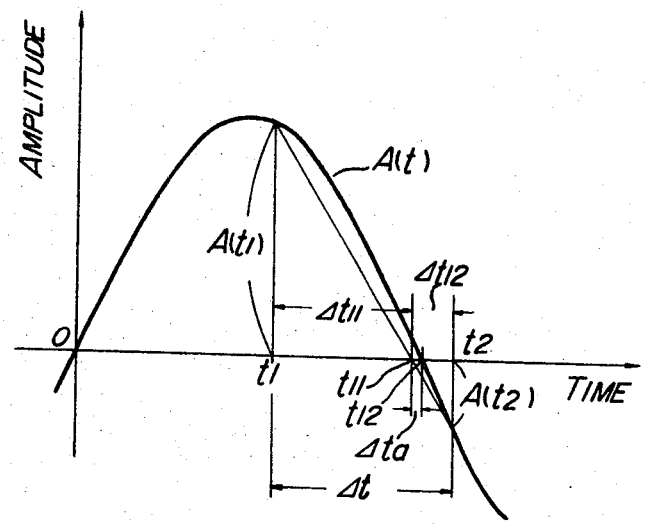
FIG. 1 is a wave form diagram for illustrating the basic principle of this invention.

FIG. 1 is a coordinate representation of a sinusoidal ac signal $A(t)$ (hereafter referred to briefly as ac signal) whose amplitude varies with the duration of time, the abscissa and ordinate measuring time and amplitude, respectively. The figure shows how the zero points of the ac signal $A(t)$ are detected according to the method of the invention.

Now, let is be taken that the amplitude of the ac signal $A(t)$ at a time $t_1$ be $A(t_1)$ while that at another time $t_2$ be $A(t_2)$, as in FIG. 1. Therefore, if the condition or inequality holds such that $$A(t_1) \cdot A(t_2) \leq 0 \quad (1),$$

then the zero point of the ac signal $A(t)$ must lie between the two time points $t_1$ and $t_2$, that is, $A(t)$ becomes equal to zero for a time $t$ such that $t_1 \leq t \leq t_2$. And this is always true where the interval $\Delta t$ between $t_1$ and $t_2$ is taken shorter than the period $T$ of the ac signal $A(t)$.

Assuming that the zero point of the ac signal $A(t)$ lies between $t_1$ and $t_2$, consideration is next given to the relationship between the point $t_{11}$ (assumed zero) on the abscissa where a straight line passing through the point represented by $A(t_1)$ and the point represented by $A(t_2)$ intersects the abscissa and the point $t_{12}$ (actual zero)

on the abscissa where $A(t)$ becomes zero, that is, $A(t_{12}) = 0$. It is known that if the points $t_1$ and $t_2$ are appropriately chosen the points $t_{11}$ and $t_{12}$ may coincide with each other. For arbitrary selection of $t_1$ and $t_2$, however, they usually differ from each other. The time interval $\Delta t_{11}$ from $t_1$ to $t_{11}$, and the time interval $\Delta t_{12}$ from $t_{11}$ to $t_2$ are given by the following expressions:

$$\Delta t_{11} = [|A(t_1)|/(|A(t_1)| + |A(t_2)|)] \cdot \Delta t \quad (2), \text{ and}$$

$$\Delta t_{12} = [|A(t_2)|/(|A(t_1)| + |A(t_2)|)] \cdot \Delta t \quad (3).$$

By reference to FIG. 1, therefore, it follows that $t_{11} = t_1 + \Delta t_{11}$. Hence, the assumed zero $A(t_{11})$ of the ac signal $A(t)$ can be obtained. Investigation will now be made into the difference between the points $t_{11}$ and $t_{12}$, i.e., the error $\Delta t_1$ involved in the case where the abscissa $t_{12}$ giving the actual zero $A(t_{12})$ is approximately obtained by the use of the abscissa $t_{11}$ giving the assumed zero $A(t_{11})$ and the expressions (2) and (3) above. It is concluded, from trial calculations where many arbitrary values smaller than one half of the period $T$ of the alternating current $A(t)$ are substituted for $\Delta t$, that the error $\Delta t_1$ is, at the most, about $1/36 \pi$ radian ($=5°$) in terms of phase angles associated with the ac signal $A(t)$ if $\Delta t$ takes values less than ¼ $T$.

Accordingly, the present invention contemplates a method of calculating the zero point of the ac Signal $A(t)$ by virtue of the above introduced expressions (1), (2) and (3), in which a sampling signal is used that has sampling period $\Delta t$ shorter than a quarter of the period $T$ of the ac signal $A(t)$. Also, according to the present invention, there is provided a method of digitally processing alternating current on the basis of such zero points as obtained in the preceding artifice, by which method the same result can be obtained as may be attained by a protective relay system now in use.

Figure 2:
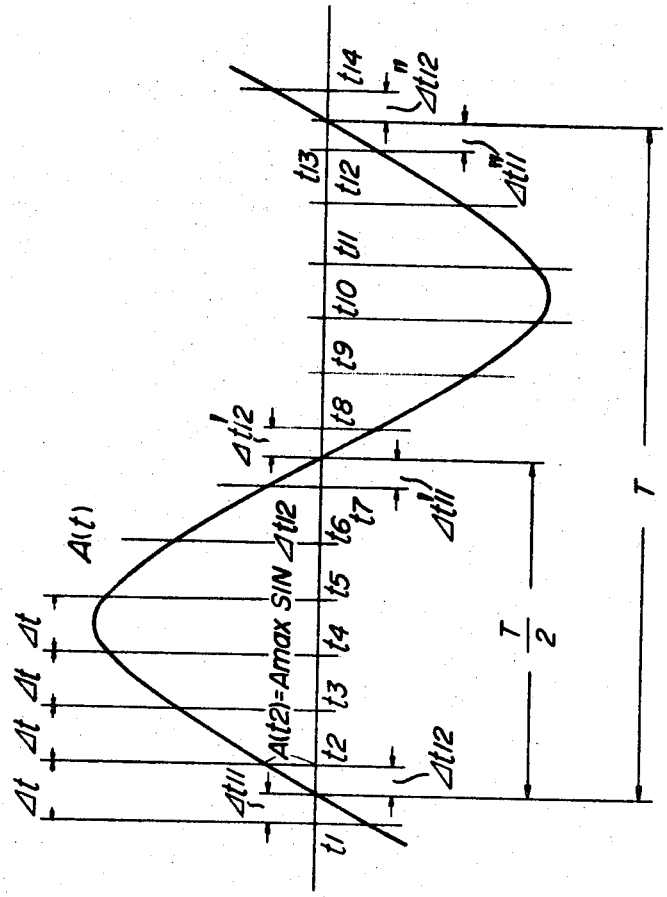
FIG. 2 is a wave form diagram for illustrating the invention applied especially to the detection of frequencies of sinusoidal signals.

FIG. 2 is a wave form diagram for illustrating the artifice of zero point derivation described in conjunction with FIG. 1, applied especially to the frequency detection of the ac signal $A(t)$. The ac signal $A(t)$ is sampled at points of time $t_1, t_2, t_3, \ldots, t_{14}, \ldots$, the period of sampling being $\Delta t$ such that $\Delta t \leq \frac{1}{4}T$, where $T$ is the period of the ac signal $A(t)$. As is apparent from the foregoing description made by reference to FIG. 1, the products $A(t_1) \cdot A(t_2)$, $A(t_7) \cdot A(t_8)$ and $A(t_{13}) \cdot A(t_{14})$ are all negative; $A(t_1)$, $A(t_7)$ and $A(t_{13})$ being the instanteous valves of the ac signal $A(t)$ sampled at moments $t_1$, $t_7$ and $t_{13}$, and $A(t_2)$, $A(t_8)$ and $A(t_{14})$ being the instantaneous values of $A(t)$ sampled at moments $t_2$, $t_8$ and $t_{14}$ succeeding, after one sampling period $\Delta t$, respectively to the moments $t_1$, $t_7$ and $t_{13}$. And it is ascertained at $t_2$, $t_8$ and $t_{14}$ that the ac signal $A(t)$ will have zeroes respectively between $t_1$ and $t_2$, $t_7$ and $t_8$, and $t_{13}$ and $t_{14}$. Consequently, the times $\Delta t_{11}$, $\Delta t_{12}$, $\Delta t'_{11}$, $\Delta t'_{12}$, $\Delta t''_{11}$ and $\Delta t''_{12}$ respectively from $t_1$ up to the first zero, from $t_2$ up to the first zero, from $t_7$ up to the second zero, from $t_8$ up to the second zero, from $t_{13}$ up to the third zero, and from $t_{14}$ up to the third zero, as seen in FIG. 1, can be derived through the method described by reference to FIG. 1. Now, the period $T$ and the half thereof $T/2$ are given by the following expressions:

$$T/2 = 5\Delta t + \Delta t_{12} + t'_{11} \quad (4), \text{ and}$$

$$T = 11\Delta t + \Delta t_{12} + \Delta t''_{11} \quad (5).$$

Accordingly, by calculating the reciprocal of $T$ from the above formula (4) or (5), the frequency of the ac signal $A(t)$ can be obtained. The multiplying factor, i.e., the numeral coefficient, of $\Delta t$ in (4) is equal to the number $k$ of sampling pulses not pertaining to the derivation of zero points of ac signal $A(t)$, while that of $\Delta t$ in (5) equal to $k + 1$. Although the period $T$ of the ac signal $A(t)$ can be obtained from both the formulae (4) and (5), the formula (5) should be employed where the alternating current $A(t)$ contains a dc component of transience.

Reference should now be made to FIG. 3, with which the detection of the phase difference between two ac signals. $A(t)$ and $B(t)$ by simultaneous sampling having a predetermined sampling period $\Delta t$ will be described. As described with FIG. 2, the alternating currents $A(t)$ and $B(t)$ are simultaneously subjected to sampling at $t_1$, $t_2, \ldots, t_{13}, t_{14}, \ldots$ to produce the corresponding instantaneous values $A(t_1)$, $B(t_1)$, $A(t_2)$, $B(t_2)$, $\ldots$, $A(t_{13}) B(t_{13})$, $A(t_{14})$, $B(t_{14})$, $\ldots$ etc. As to the alternating current $A(t)$, the derivation of zero points is possible at the moments $t_2$ and $t_8$, whereas with respect to the ac signal $B(t)$ its zero points can be detected at $t_5$ and $t_{11}$. Therefore, if the times $\Delta t_{11}$, $\Delta t_{12}$, $\Delta t'_{11}$, $\Delta t'_{12}$, $\Delta t''_{11}$ and $\Delta t''_{12}$ etc. from the respective sampling points to the associated zero points can be derived, then the phase differences $\phi$ between the ac signals $A(t)$ and $B(t)$ respectively for the moments $t_5$ and $t_8$ are $$\phi = \Delta t_{12} + 2\Delta t + \Delta t'_{11} \quad (6), \text{ and}$$

$$\phi = \pi - (\Delta t'_{12} + 2\Delta t + \Delta t''_{11}) \quad (7).$$

Here, also, the coefficients of $\Delta ts$ in the above expressions (6) and (7) are equal to the number of sampling pulses not pertaining to the derivation of zero point of the ac signal, as the previous description with FIG. 2 has indicated.

As results from the above, the expression for calculating the phase difference between $A(t)$ and $B(t)$ take two forms (6) and (7) depending on the points of zero point derivation although the correlation between the ac signals $A(t)$ and $B(t)$ remains invariant. That is because in this invention, as is apparent from the description made by reference to FIG. 1, the derivation of zero point is performed regardless of whether the amplitude of the ac signal $A(t)$ varies from negative value to positive one or vice versa. Therefore, it is necessary to consider the relation between $A(t)$ and $B(t)$ when one of the formulae (6) and (7) is desired to be employed.

Which one of the formulae to choose can be easily determined by examining the patterns shown in FIGS. 4a through 4k.

Figure 4A:
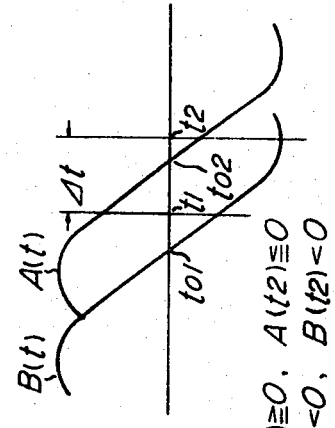
FIG. 4a to FIG. 4k are also wave form diagrams for illustrating the possible discriminating patterns occurring between sinusoidal signals in case of phase difference detection as in FIG. 3.
Figure 4C:
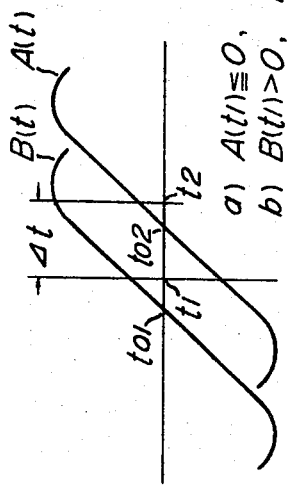
Figure 4B:
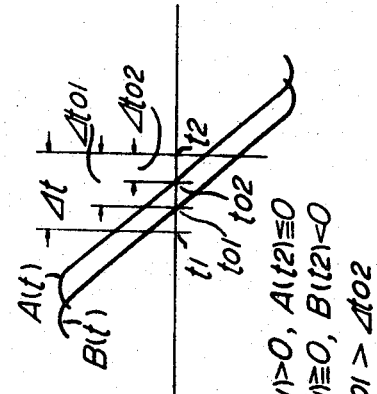
Figure 4D:
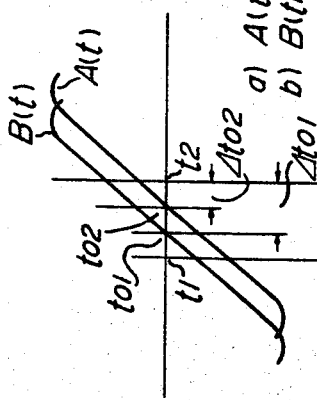
Figure 4E:
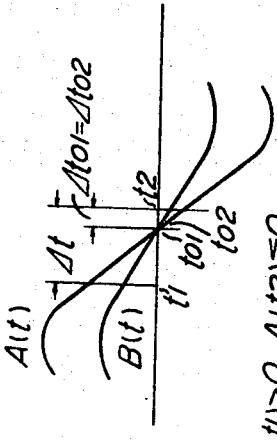
Figure 4F:
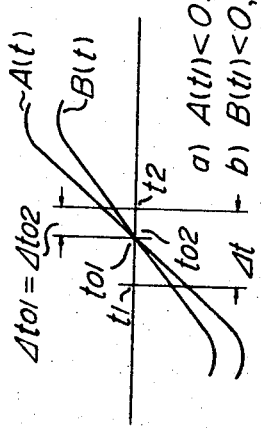
Figure 4G:
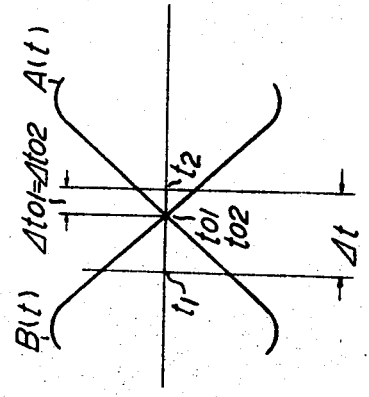
Figure 4I:
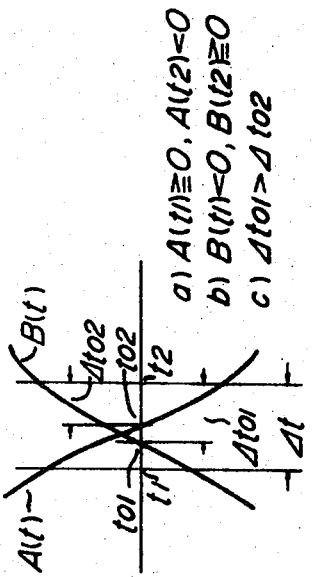
Figure 4K:
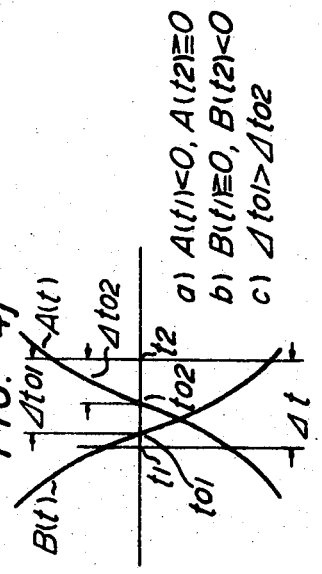
Figure 4H:
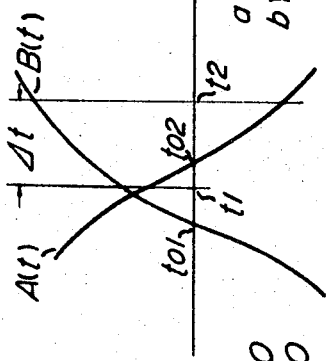
Figure 4J:
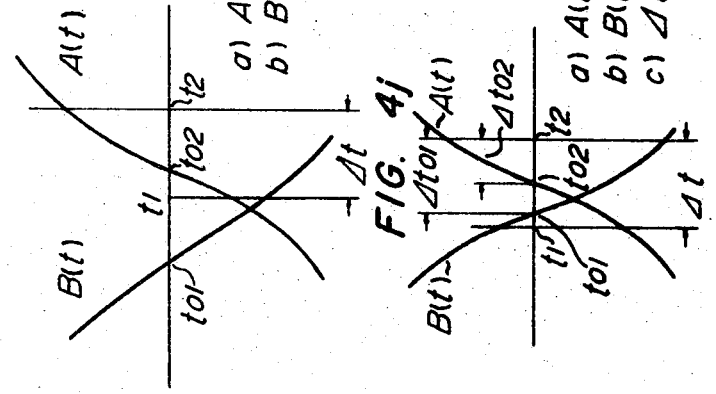

FIGS. 4a to 4d show patterns in which the phase difference $\phi$ between the ac signals $A(t)$ and $B(t)$ is equal or less than $\pi/2$, the patterns in FIGS. 4a and 4b corresponding to the case where $\pi/2 \geq \phi > \Delta t$ ($\Delta t$ is the sampling period such that $\pi/2 > \Delta t > 0$) and the patterns in FIGS. 4c and 4d to the case where $\Delta t \geq \phi > 0$. FIGS. 4e and 4f give the patterns in which the phase difference $\phi$ is zero while FIG. 4g indicates that $\phi = \pi$. In the patterns of FIG. 4h to 4k, it is seen that $\pi/2 < \phi < \pi$. More precisely, $\pi/2 < \phi \leq (\pi - \Delta t)$ for FIGS. 4h and 4i, and $(\pi - \Delta t) < \phi \leq \pi$ for FIG. 4j and 4k. In sum, the patterns in FIGS. 4a to 4d correspond to the cases where the ac signal $A(t)$ lags in phase behind the ac signal $B(t)$, in FIG. 4g $A(t)$ is opposite in phase to $B(t)$, and in FIGS. 4h to 4k $A(t)$ leads $B(t)$ in phase. Conditions a), b) and c) attached to each pattern provide a quantitative base for discriminating the phase relation between $A(t)$ and $B(t)$. Even if the phase relations between $A(t)$ and $B(t)$ as shown in FIGS. 4a to 4k are inverted, the phase discrimination is possible merely interchanging the roles of $A(t)$ and $B(t)$ in the conditions a and b. In conclusion, as apparent from FIG. 3 and the formulae (6) and (7), the phase difference $\phi$ should be calculated by virtue of the formula (6) if one of the patterns of FIGS. 4a to 4d is the case or by virtue of the formula (7) for one of the patterns of FIGS. 4h to 4k.

Description will now be made of how the patterns of FIGS. 4a to 4k should be interpreted. The sampling points $t_1$ and $t_2$ correspond to $t_1$ and $t_2$, $t_4$ and $t_5$, $t_7$ and $t_8$, or $t_{10}$ nand $t_{11}$ in FIG. 3. The sampling period is $\Delta t$. The points $t_{01}$ and $t_{02}$ are respectively the points where the ac signal $B(t)$ and $A(t)$ change from the negative level to positive one or from the positive level to negative one. Namely, $B(t)$ and $A(t)$ becomes zero respectively at $t_{01}$ and $t_{02}$. In FIGS. 4a to 4k, $t_{01}$ and $t_{02}$ are the actual zeroes of $B(t)$ and $A(t)$ but they can be regarded as the assumed zeroes as obtained according to the artifice described with FIG. 1, that is, $t_{11}$ in FIG. 1. The time intervals $\Delta t_{01}$ and $\Delta t_{02}$ are measured respectively from $t_{01}$ to $t_2$ and from $t_{02}$ to $t_2$.

Now, the phase difference between the ac signal $A(t)$ and $B(t)$ will be calculated at the moment $t_2$ after the zero of $A(t)$ is found to lie between $t_1$ and $t_2$. If in this case the conditions hold such that a. $A(t_1) > 0$, $A(t_2) \leq 0$,
b. $B(t_1) \geq 0$, $B(t_2) < 0$, and
c. $\Delta t_{01} > \Delta t_{02}$, then the relative positions of $A(t)$ and $B(t)$ will be respresented in the pattern of FIG. 4d. And the formula (6) is used for the calculation of the phase difference. Different patterns are taken for other conditions.

FIG. 5 is a block diagram showing the basic structure of a device as one embodiment of the invention, which device can detect the frequency of ac signal and the phase difference between different ac signals. The device in FIG. 5 has two inputs for ac signal $A(t)$ and $B(t)$, but only one of the signals $A(t)$ or $B(t)$ may be used. A clock pulse generator 11 produces a train of clock pulses having a predetermined sampling period $\Delta t$. Sample and hold circuits 13 and 15, when they receive clock pulses from the clock pulse generator 11, hold the instantaneous values of the input signal $A(t)$ and $B(t)$ corresponding to the clock pulses received until the operation of an analog-digital converter, which is described later, is completed. A control circuit 17 supplies various circuits, which are later described, predetermined control signals set in a predetermined timing relation to the clock pulses from the generator 11. A scanning circuit 19 passes the outputs from the sample and hold circuits 13 and 15 alternately in response to the signal $S_1$ from the control circuit 17. An analog-digital converter circuit 21 converts, in response to the signal $S_2$ from the control circuit 17, the outputs of the sample and hold circuits 13 and 15 transferred through the scanning circuit 19 into corresponding digital signals. A buffer memory 23 stores the output of the analog-digital converter circuit 21 in response to the signal $S_3$ from the control circuit 17. A discriminator section 25 reads out the data concerning the ac signals $A(t)$ and $B(t)$ stored in the buffer memory 23 in response to the signal $S_4$ from the control circuit 17 and then performs predetermined arithmetic and discrimiative operations.

The signals $S_1$, $S_2$, $S_3$ and $S_4$ delivered from the control circuit 17 are not of the same kind but different so that the discriminator section 25 may perform desired discriminating operations, as will be described later.

The description of the basic structure shown in FIG. 5 and of wave form diagrams shown in FIGS. 1 to 4 will reveal how the zero points, and the period of the ac signal $A(t)$, and the phase difference between the ac signals $A(t)$ and $B(t)$ are to be derived. However, operations to derive such quantities as period and phase differences along do not satisfy the function of a protective relay in current use. Therefore, it is described below how the data obtained from the above described constitutions are to be utilized to fulfil the functions of various protective relays.

1. Phase-difference detection relay

The discriminator section 25 is so designed as to produce an output only when the phase difference $\phi$ obtained according to the artifice described with FIG. 3 and FIGS. 4a to 4k is greater or smaller than a predetermined value $\phi_0$.

2. Frequency detection relay

The discriminator section 25 is so designed as to produce an output only when the period T or ½T obtained according to the artifice described with FIG. 2 is no longer or shorter than a given interval of time $T_{01}$ or ½$T_{01}$ (, or $T_{02}$ or ½$T_{02}$).

3. Peak-value detection relay

The energization or deenergization of a relay such as an over-voltage relay, an over-current relay, or an under-voltwge relay which operates upon detection of a peak value in ac signal $A(t)$, is determined as follows.

As is apparent from the wave form diagram of FIG. 2, the time $\Delta t_{12}$ from the moment $t_2$ to the zero of the ac signal $A(t)$ cun be derived according to the artifice described with FIG. 1, after the ac signal $A(t)$ is sampled at $t_2$. And the instantaneous value or sampled value $A(t_2)$ of the ac signal $A(t)$ at $t_2$ is given by the experession:

$$A(t_2) = A_{max} \sin (\Delta t_{12})$$

(8), where $A_{max}$ is the amplitude peak of the ac signal $A(t)$. Therefore, the peak value $A_{max}$ is given by the expression:

$$A_{max} = [|A(t_2)|/(|\sin (\Delta t_{12})|)]$$

(9), which can be expressed with only the data available at the time $t_2$. Also, the sampled values $A(t_3)$ and $A(t_4)$ of the ac signal $A(t)$ at $t_3$ and $t_4$ are calculated respectively by the formulae:

$$A(t_3) = A_{max} \sin(\Delta t + \Delta t_{12})$$

(8)', and $$A(t_4) = A_{max} \sin(2\Delta t + \Delta t_{12})$$

(8)''.

Consequently, the peak value can be obtained by the following formulae:

$$A_{max} = |A(t_3)|/|\sin(\Delta t + \Delta t_{12})|$$

(9)', and $$A_{max} = |A(t_4)|/|\sin(2\Delta t + \Delta t_{12})|$$

(9)''.

For other points of sampling $t_5, t_6, \ldots$, etc., similar formulae will be derived through similar steps of analyses.

Therefore, the peak value can be obtained for every sampling point so that a protective device which responds to the peak value of the input signal can be realized by the use of this mechanism. In this case, a more reliable discrimination could be expected if it is ascertained before the operation of the protective device that all the calculated results at several successive sampling points satisfy a predetermined condition or if the peak value for $k \cdot \Delta t + \Delta t_{12}$ nearest $\pi/2$ is used as a criterion of discriminating the abnormality, where k is the number of sampling pulses having nothing to do with the derivation of the zeroes of the signal.

4. Power detection relay

The energization or deenergization of such a relay as a power directional relay or a power flow monitor relay which operates by detecting a quantity corresponding to the product of voltage and current, is determined as follows.

Let it be assumed that the ac signals $A(t)$ and $B(t)$ in FIG. 3 are the voltage represented by $V\sin \omega t$ and the current represented by $I\sin(\omega t - \phi)$, respectively, then it is clear that the phase difference $\phi$ between the voltage and the current can be derived according to the artifice described with FIGS. 3 and 4. Also, as is apparent from the above description of the peak value detection relay, the peak value of the voltage or the current can be derived for every sampling point.

On the other hand, power P as the product of voltage and current is given by the expression:

$$P = VI\cos\phi$$

(10).

Therefore, the power P can be calculated from separately obtained quantities V, I, and $\phi$, first by calculating $\cos\phi$ from $\phi$ and secondly by making a product of V, I and $\cos\phi$. The thus calculated power is then used as a criterion of discriminating the abnormality. In this case, a particular value of $\cos\phi$ may be derived from one of the previously stored data of $\cos\phi$ which corresponds to a particular value of $\phi$, in order to simplify the calculation of $\cos\phi$.

5. Impedance detection relay

The energization or deenergization of such a relay as an impedance relay to serve as a distance relay or a mho relay to serve as directional distance relay, which operates by detecting a quantity corresponding to the ratio of voltage to current, is determined as follows.

It is well known that if the voltage and the current measured in a certain ac circuit are given respectively by $V\sin \omega t$ and $I\sin(\omega t - \phi)$, the impedance Z, the reactance X and the resistance R of the circuit are such that $$Z = V/I, \quad X = V/I \sin\phi, \text{ and } R = V/I\cos\phi$$

(11).

Therefore, only the ratio of voltage to current is necessary to be calculated for the impedance relay. For the reactance relay or the resistance relay, too, it is only necessary to derive $\sin\phi$ or $\cos\phi$ from $\phi$ and to calculate the product $V/I \sin\phi$ or $V/I \cos\phi$. In this case, also, as in the power detection relay, a particular value of $\sin\phi$ or $\cos\phi$ is made to be detained from one of the data of $\sin\phi$ or $\cos\phi$ previously stored for various values of $\phi$ which corresponds to a perticular value of $\phi$.

Figure 6:
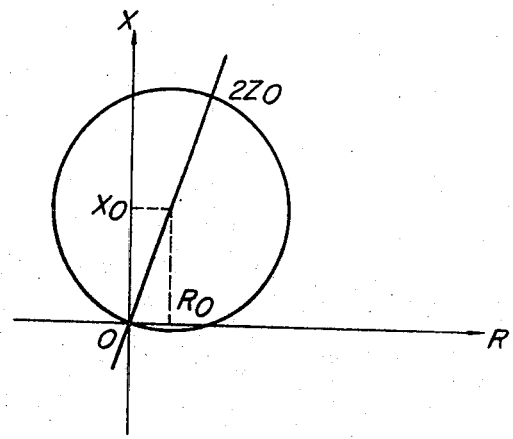
FIG. 6 is an impedance diagram for illustrating the mho characteristic of a protective relay.

FIG. 6 shows an impedance diagram of a mho relay, in which resistance is taken as the abscissa variable and reactance as the ordinate variable. As is apparent from FIG. 6, the mho relay is equivalent to an impedance relay (with a setting impedance $Z_o$) parallel shifted from the origin of the coordinate system to a point whose abscissa and ordinate are equal respectively to a setting resistance $R_o$ and a setting reactance $X_o$. Therefore, by using Z, X and R obtained from the expressions (11), the following relation is obtained:

$$(X_o - X)^2 + (R_o - R)^2 \leq Z_o^2$$

(12).

In order to perform the function of a mho relay, the discriminator section 25 is so designed as to deliver an output only if the condition satisfied by the relation (12) is reached.

In this way, it is seen that the device according to the invention can achieve the functions of various kinds of protective relays by appropriately designing the discriminator section. In the following, description will be made of the actual ways of calculating the various quantities required to be obtained so as to analyze the functions of the protective relays. As is apparent from FIG. 5 which shows the basic configuration of one embodiment of the invention, according to the invention the ac signal is sampled at constant period to provide the corresponding digital information, which is then fed to the discriminator section that judges from the digital information whether a predetermined condition is satisfied or not, and the overall operation of the individual elements is governed by the control circuit. The flowcharts given below correspond to the discriminating operations associated mainly with the discriminator section.

1. Flowchart for zero point detection operation

FIG. 7 shows a flowchart for the detection of the zero points of an ac signal. At step 101 is instructed a start as by an interruption. Such an interruption may be one of the sampling pulses $t_1, t_2, \ldots$ which are described with FIGS. 1 to 4 and which serve to start this flow of zero detection or may be other signals by which the computor is adapted for other purposes. Discrimination is made at step 103 of whether the interruption is for the start of the zero point detection flow or not. The flow follows the course labeled "YES" if the interruption is for the start of the zero point detection flow, but follows the other course labeled "NO" otherwise. If the flow advances along the NO course, as the result of the discrimination at the step 103, then the computor is disengaged from the job of discrimation and sets about another job at step 104. If the result of discrimination at the step 103 is YES, the instantaneous value of an ac signal $A(t)$ at a moment $t_n$, i.e. $A(t_n)$ is read at step 105. At step 107 the product $A(t_{n-1}) \cdot A(t_n)$ of the instantaneous value $A(t_{n-1})$ at a sampling point $t_{n-1}$ just preceding the sampling point $t_n$ and the value $A(t_n)$ is made and calculated. At step 109 discrimination is made of whether the value of the product calculated at the step 107 is equal to or less than zero or greater than zero. If the product is equal to or less than zero, that is, $A(t_{n-1}) \cdot A(t_n) \leq 0$, the flow follows YES course to reach step 111. If the product is larger than zero, that is, $A(t_{n-1}) \cdot A(t_n) > 0$, the flow follows NO course to reach step 110 where the computor is disengaged from the job and sets about another job. If the result of discrimination at the step 109 is YES, then at step 111 $\Delta t_{11}$ and $\Delta t_{12}$ are calculated according to the artifice described with FIG. 1. Thus the zero point of the ac signal $A(t)$ can be derived from the data with respect to the sampling points $t_{n-1}$ or $t_n$. Then, the computor completes its job and sets about another job at step 113.

2. Flowchart for phase difference detection operation

Figure 8:
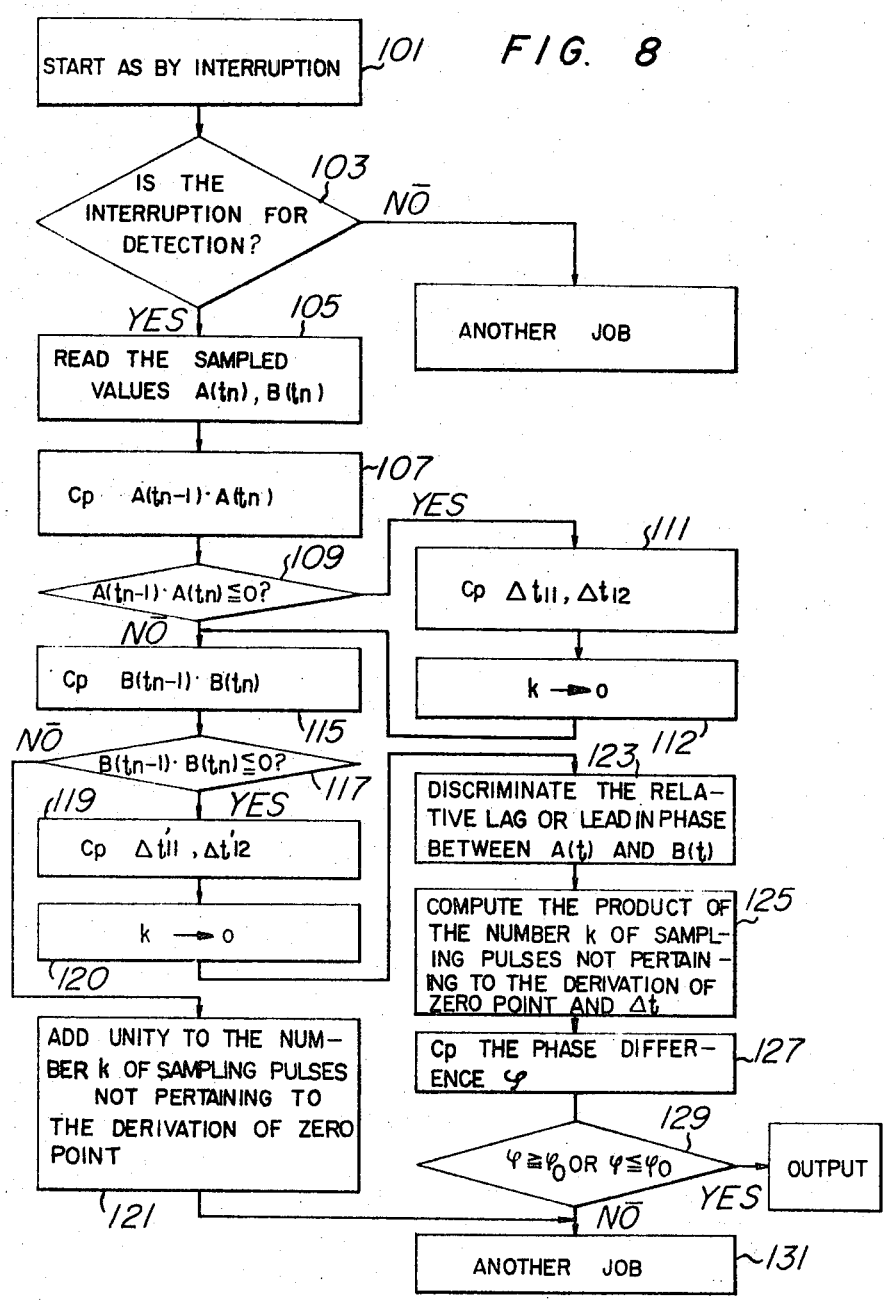
FIG. 8 is a flowchart drawn for the detection of phase differences between two sinusoidal ac signals.

FIG. 8 shows a flowchart for the detection of the phase difference between two ac signals $A(t)$ and $B(t)$. In this flowchart steps 101 to 111 are similar to those indicated at the same numerals in the flowchart of FIG. 7. Only a major difference is that in this case the two ac signals $A(t)$ and $B(t)$ are introduced. Further, after $\Delta t_{11}$ and $\Delta t_{12}$ are calculated at the step 111, the operation of reducing the coefficient $k$ of $\Delta t$ to zero, which will be described later, is performed at step 112, and even if the result of discrimination at the step 109 is NO, the computor does not immediately set about another job but step 115 is reached to calculate the product $B(t_{n-1}) \cdot B(t_n)$. And at step 117 discrimination is made of whether the product is equal to or smaller than zero or greater than zero, as at step 109. If the result of discrimination at the step 117 is YES, that is, $B(t_{n-1}) \cdot B(t_n) \geq 0$, $\Delta t_{11}$ and $\Delta t'_{12}$ are calculated at step 119 to derive the zero of the ac signal $B(t)$. At step 120 the operation, which will be later described, of reducing the coefficient $k$ of $\Delta t$ to zero is performed. If the result of discrimination at the step 117 is NO, this corresponding to the point $t_3$ in FIG. 3, then the coefficient $k$ of $\Delta t$ is changed to $k + 1$ by adding unity thereto at step 121, $k$ being the multiplier of $\Delta t$ occurring in the case of a phase difference calculation. If the result of discrimination at the step 109 or the step 117 is YES, then not only $\Delta t_{11}$ and $\Delta t_{12}$ or $\Delta t'_{11}$ and $\Delta t'_{12}$ are calculated at the step 111 or 119 respectively, but also step 123 is reached where the relative lag or lead in phase between the ac signals $A(t)$ and $B(t)$ is detected. This detection is performed according to the patterns shown in FIGS. 4a to 4k. At step 125 is calculated the product $k \cdot \Delta t$ of the number $k$ of the sampling pulses not pertaining to the derivation of zero point and the sampling period $\Delta t$. At step 127 the phase difference $\phi$ is calculated on the basis of the formulae (6) and (7). At the step 121 or 127 the operation of this phase difference operation may terminate, but in order to simulate exactly the function of a relay which produces an output only when the relation between the phase difference $\phi$ and a setting value $\phi_o$ is such that $\phi \geq \phi_o$ or that $\phi < \phi_o$, another step 129 has to be provided to examine the relation. And according to the results of the previous examination the respective outputs are to be delivered or step 131 for another job may be reached.

3. Flowchart for frequency detection operation

Figure 9:
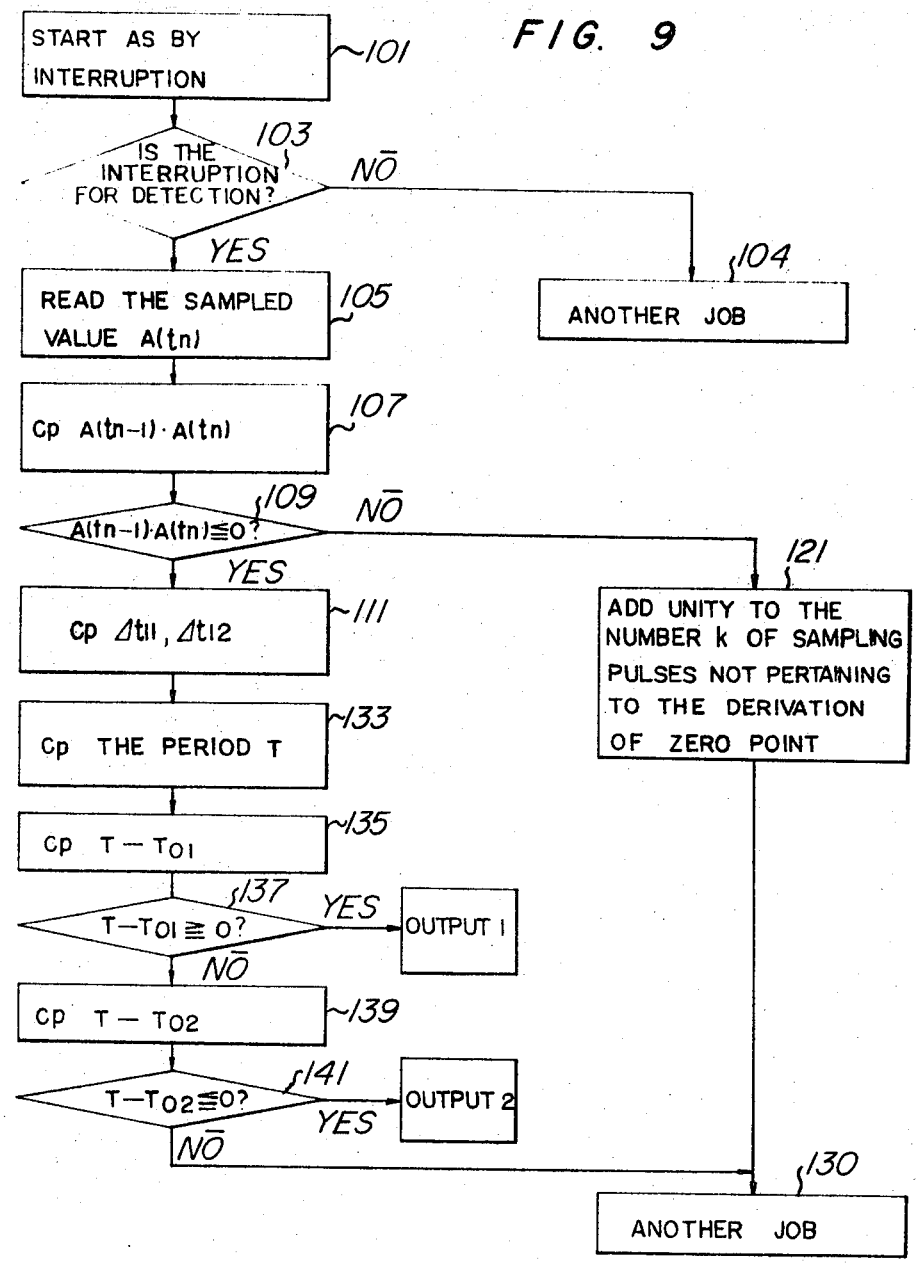
FIG. 9 is a flowchart representing the function of a frequency relay.

FIG. 9 shows a flowchart for the operation of detecting the frequency of an ac signal $A(t)$. In this flowchart steps 101 to 109 and step 111 have the same roles as the corresponding steps 101 to 109 and 111 in the flowchart for the zero point detection operation. If $A(t_{n-1}) \cdot A(t_n)$ is greater than zero, the flow follows the NO route to reach step 121 where unity is added to the stored number $k$ of the sampling pulses not pertaining to the derivation of zero point to form $k + 1$. And the computor sets about another job at step 130. If the result of discrimination at the step 109 is YES, step 111 is reached to derive $\Delta t_{11}$ and $\Delta t_{12}$. Then step 133 is reached to calculate the period T, the period T being calculated, for example, from the formula (5). The multiplier of $\Delta t$ at a certain particular sampling point is the value at the particular sampling point of the number $k$ stored in the computor at the step 121. At step 135 is obtained the difference between the period T obtained at the step 133 and a setting value $T_{01}$. Discrimination is made of whether condition that $T - T_{01} \geq 0$ is satisfied or not, at step 137. If the result of discrimination is YES, the YES route is followed to deliver an output 1 indicating that the frequency is lowered below a certain level. If the condition that $T - T_{01} \geq 0$ is not satisfied, the flow takes the NO route to reach step 139. At the step 139, $T - T_{01}$ is calculated from the period T and the setting value $T_{01}$, and at step 141 discrimination is made of whether the calculated result satisfies the condition that $T - T_{01} \leq 0$. If the condition is satisfied, the flow takes the YES route to deliver an output 2 indicating that the frequency is raised above a certain level. On the other hand, if the condition is not satisfied, the NO route is followed to reach the step 130. At the step 130 the computor will set about another job.

4. Flowchart for peak-value detection operation

Figure 10:
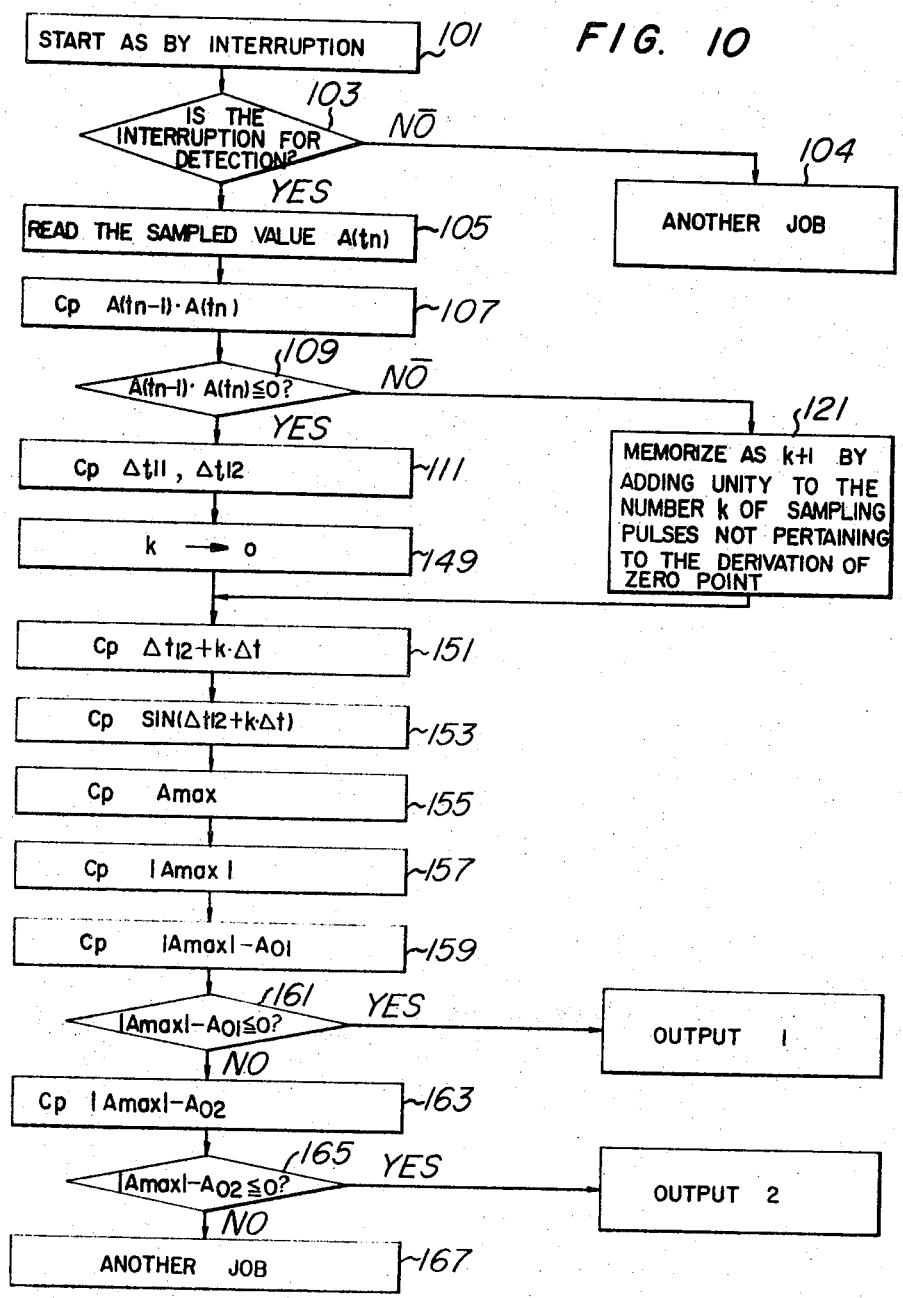
FIG. 10 is a flowchart representing the function of a peak detecting relay.

FIG. 10 shows a flowchart for simulating the function of a peak-value detection relay. Also, in this case, steps 101 to 109 and 111 are the same as the corresponding steps in the flowchart for the zero point detection operation. If the result of discrimination at the step 109 is NO, step 121 is reached to store $k + 1$ which is made up by adding unity to the number $k$ of the sampling pulses not pertaining to the derivation of zero point. When the result of discrimination at the step 109 is YES and therefore $\Delta t_{11}$ and $\Delta t_{12}$ are calculated at step 111, the stored number $k$ is cleared to zero at step 149. At step 151 $\Delta t_{12} + k \cdot \Delta t$ is calculated and at step 153 sin $(\Delta t_{12} + k \cdot \Delta t)$ is calculated. Finally, a peak value $A_{max}$ is calculated by virtue of the formulae (9), (9)' and (9)'' at step 155. Since in this invention the point of time at which a series of calculations are started is renewed each time the ac signal reaches its zero, the absolute value of $A_{max}$ is calculated at step 157. At step 159 the difference $|A_{max}| - A_{01}$ between $|A_{max}|$ and a setting value $A_{01}$ is calculated. At step 161 discrimination is made of whether the condition that $|A_{max}| - A_{01} < 0$ is satisfied or not. If the condition is satisfied, an output 1 is delivered. If the condition is not satisfied, step 163 is reached to calculate $|A_{max}| - A_{02}$, $A_{02}$ being another setting value. And discrimination is made of whether the condition that $|A_{max}| - A_{02} \geq 0$ is satisfied or not at step 165. If the condition is satisfied, an output 2 is delivered, while otherwise step 167 is reached so that the computor sets about another job. Now, since the output 1 is obtained when $|A_{max}| - A_{01} \leq 0$, it is clear that the output 1 appears if $|A_{max}| \leq A_{01}$. Namely, the output 1 is equivalent to the output from such a relay as an under-voltage relay. Similarly, the output 2 is delivered when $|A_{max}| - A_{02} \geq 0$, i.e. $|A_{max}| \geq A_{02}$, and therefore the output 2 is equivalent to the output from such a relay as an over-voltage relay or an over-current relay.

5. Flowchart for power detection operation

Figure 11:
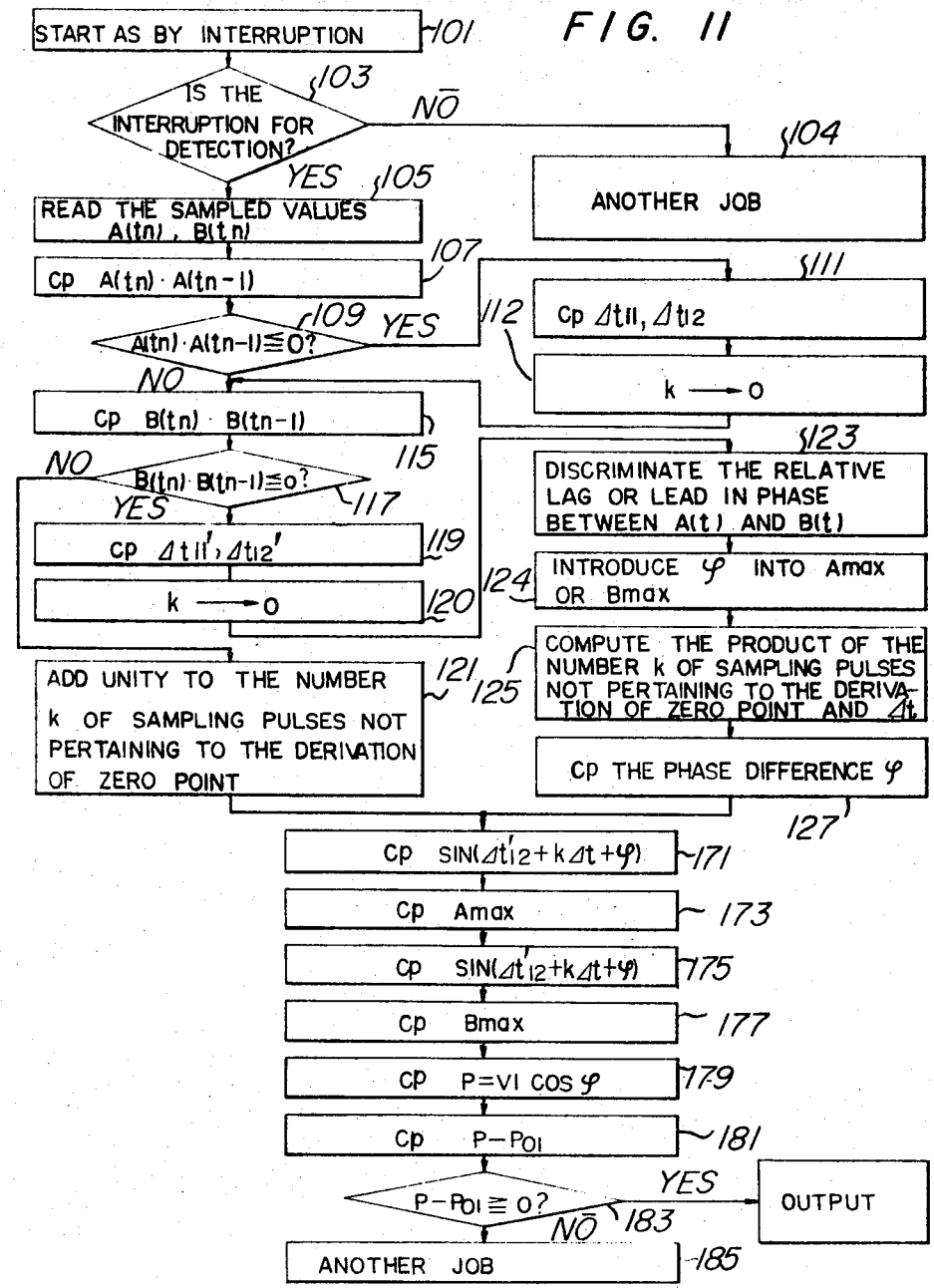
FIG. 11 is a flowchart representing the function of a power detecting relay.

FIG. 11 shows a flowchart for simulating the function of the previously described power detection relay. As has been mentioned in the description associated with a power detection relay, the peak values of the voltage and the current together with the phase difference $\phi$ therebetween are required to calculate the power. Therefore, the calculation of power itself will be set about after steps are followed where such values as voltage peak, current peak and phase difference can be obtained. In the flowchart now in question, a step to derive phase difference $\phi$ appears first, and secondly a step to obtain peak values succeeds thereto, and at last a step to calculate power is introduced. Consequently, steps before a step 171 where $\sin(\Delta t_{12} + k \cdot \Delta t + \phi)$ is calculated, are equivalent, with an exception of the addition of a step 124, to the corresponding steps in the flowchart of FIG. 8. The description of the step 124 is left till later on. At steps 171 to 177 the peak values of voltage and current are derived but the derivation of the peak values is the same as the case where two inputs are introduced in the steps 153 and 157 in the flowchart of FIG. 10. The reason why the calculation at the step 171 is associated with an angle $(\Delta t'_{12} + k \cdot \Delta t + \phi)$ and that at the step 175 with an angle $(\Delta t'_{12} + k \cdot \Delta t + \phi)$, is given below. Consideration will be taken of the case where the calculation is carried on with reference to the sampling point $t_6$. As regards $B(t)$, the peak value $B_{max}$ is given by the following formula:

$$B_{max} = |B(t_6)| / |\sin (\Delta t'_{12} + \Delta t)|,$$

while the peak value of $A(t)$, i.e. $A_{max}$ should be calculated by the formula:

$$A_{max} = |A(t_6)| / |\sin (\Delta t'_{12} + \Delta t + \phi)|.$$

The forms of these formulae are reversed in the calculation at the sampling point $t_9$. Namely, the phase difference $\phi$ is introduced in the calculation of $B_{max}$. At step 124 it is determined which of the steps 171 and 175 the phase difference $\phi$ should be introduced into. Hence, for any sampling point after the zero of $A(t)$ the phase difference is introduced into the step 175 where the preparation is made for calculating $B_{max}$, while for any sampling point after the zero of $B(t)$ it is incorporated in the step 171 where the preparation for calculating $A_{max}$ is made. $A(t)$ and $B(t)$ may be respectively voltage and current, or current and voltage. At step 179 calculation of $P = VI\cos\phi$ is performed. In this case a particular value of $\cos\phi$ may be obtained from one of $\cos\phi$'s stored beforehand which corresponds to a particular value of $\phi$. At step 181 the difference between the thus obtained power P and a setting value $P_{01}$ is detected, and then discrimination is made of whether the difference is zero or positive, or not, at step 183. If the difference is zero or positive, then an output is delivered, but if otherwise, then step 185 is reached so that the computer will set about another job.

6. Flowchart for impedance detection operation

Figure 12:
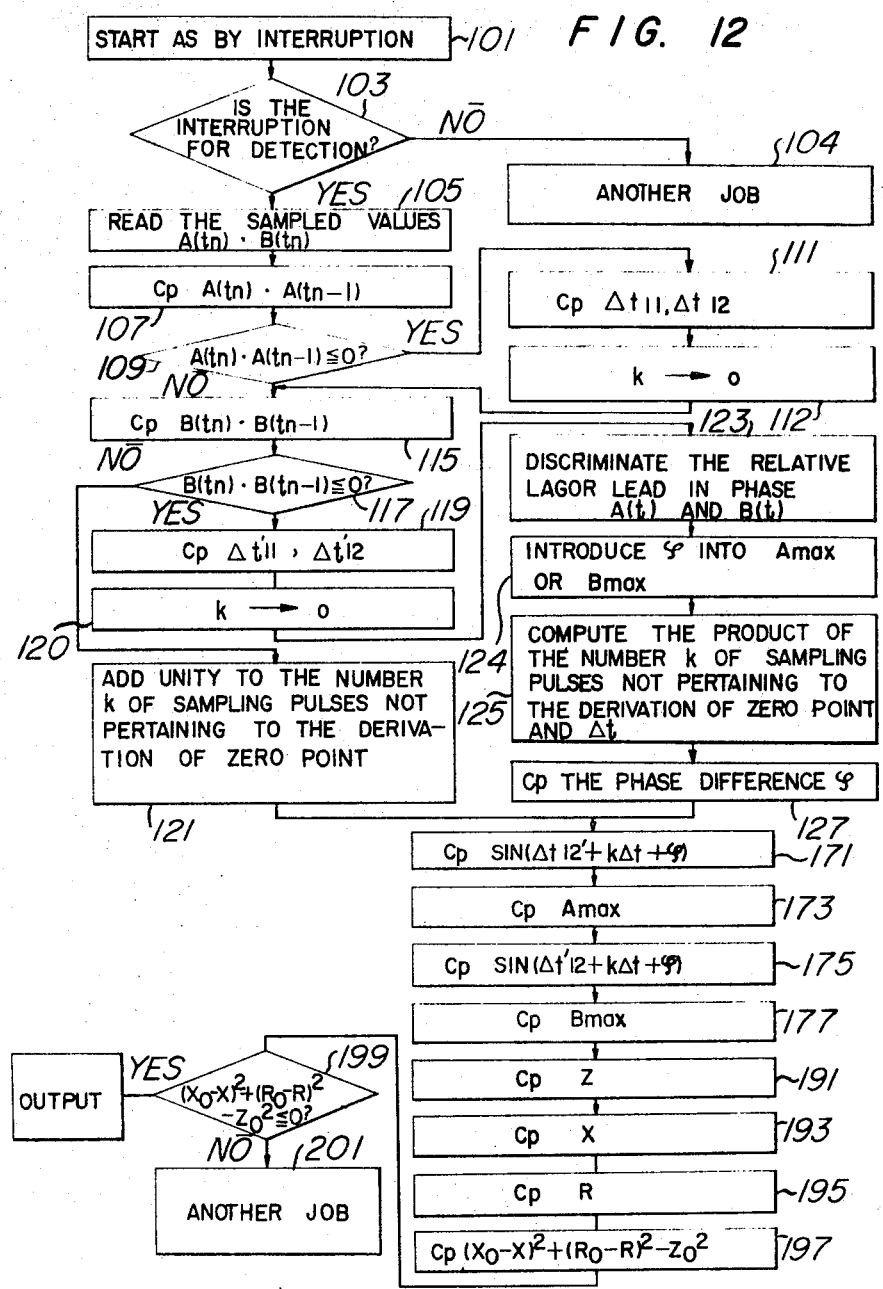
FIG. 12 is a flowchart representing the function of an impedance relay.

FIG. 12 shows a flowchart for simulating the function of the impedance relay described above. As is apparent from the formula (11) obtained above, the impedance relay can also be simulated by deriving V, I and $\cos\phi$, and therefore steps 101 to 177 in this FIG. 12 can completely be substituted by the corresponding steps in the flowchart of FIG. 11. And at steps 191, 193 and 195, respectively, are calculated Z, X and R. At step 197 calculation is made of whether the mho characteristic associated with FIG. 6 is satisfied or not, and succeeding discrimination is made at step 199. If the result of the discriminating is YES, then an output is delivered. If otherwise, however, step 201 is reached, and the computer will set about another job.

Figure 13:
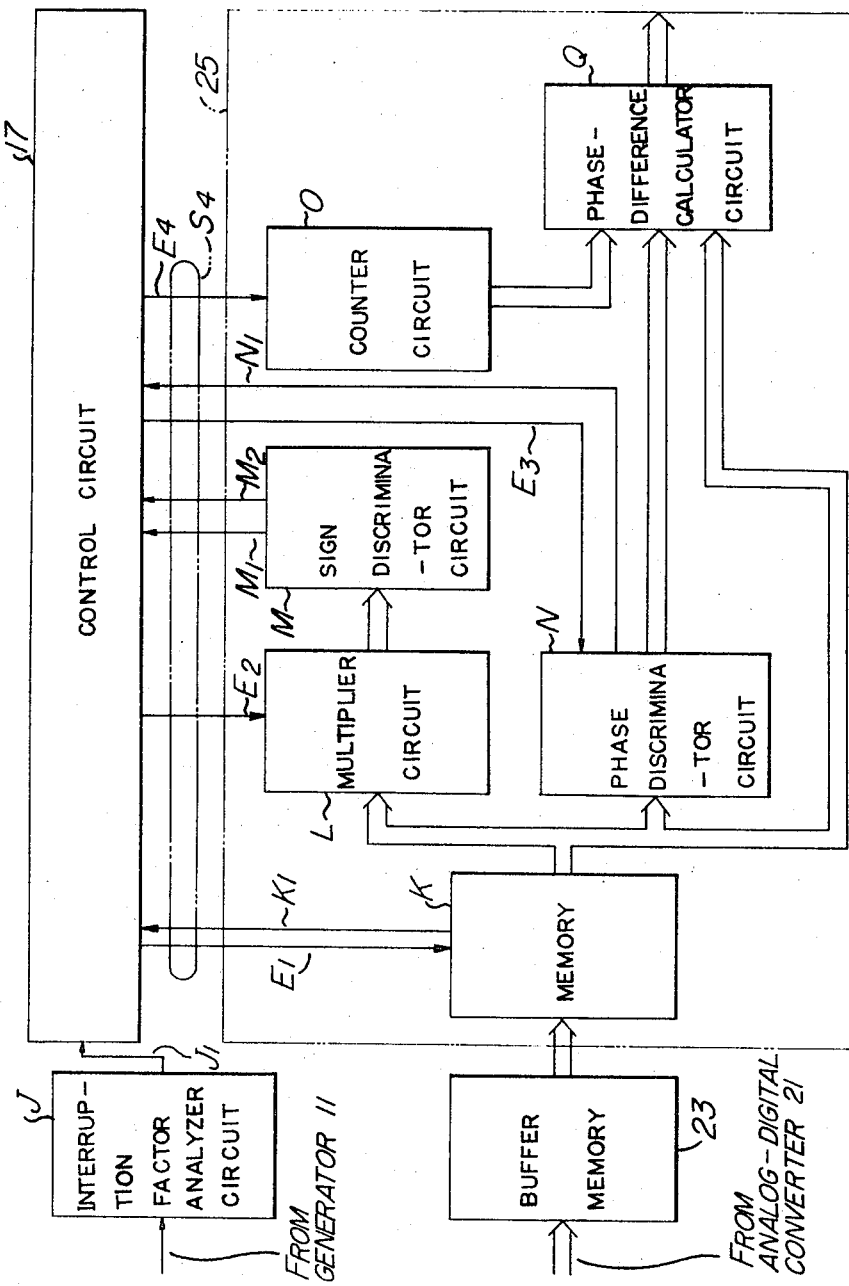
FIG. 13 shows the constitution of the discriminator section of the structure shown in FIG. 5, comprising elements each having a single function and designed to embody the flowchart shown in FIG. 8.

FIG. 13 shows the structure of the discriminator section 25 in FIG. 5, which is constituted of a plurality of units each having a single function and which is adapted for the phase difference detection operation described with FIG. 8. The arithmetic unit of a digital computer is normally used as such a discriminator section. For the sake of explanation, however, the section is represented as a combination of single-functioned units. In FIG. 13, units indicated at the same numerals as in FIG. 5 correspond to like elements. An interruption factor analyzer circuit J delivers, for example, in response to the output from the generator 11 an output J1 which drives the control circuit 17. Accordingly, the control circuit 17 operates to send to a memory K an instruction (E1) that the memory K should store digital data received through the input circuit as shown in FIG. 5. The control circuit 17, upon receiving a signal K1 that the memorizing operation of the memory K is completed, send to a multiplier circuit L an instruction (E2) that the product $A(t_n) \cdot A(t_{n-1})$ should be made (in case of $B(t)$ the product $B(t_n) \cdot B(t_{n-1})$).

As has been described before, it is apparent that if $A(t_n) \cdot A(t_{n-1}) \leq 0$ the zero of the ac signal $A(t)$ should lie between $t_n$ and $t_{n-1}$. A sign discriminator circuit M discriminates the sign of the product $A(t_n) \cdot A(t_{n-1})$ on the basis of the data received from the multiplier circuit L. And if the product is positive an output M1 is delivered, while if it is negative an output M2 is delivered. This discrimination of sign is possible, for example, by comparing the positive and negative sign bits which may be set up when analog data are converted to corresponding digital data through the analog-digital converter 21. The same steps described just above are able to be taken also in case of the ac signal $B(t)$. If the output of the sign discriminator circuit M is negative or zero, then the control circuit 17 sends to a phase discriminator circuit N an instruction E3 that discrimination should be made of the phase relationship between the ac signals $A(t)$ and $B(t)$. In the phase discriminator circuit N are stored patterns, for example, in FIGS. 4a to 4k, and the phase relationship between $A(t)$ and $B(t)$ can be known by comparing with these patterns $A(t_n)$ and $B(t_n)$ or $A(t_{n-1})$ and $B(t_{n-1})$ and by obtaining the time $t_{01}$ and $t_{02}$.

As is apparent from the description made with FIGS. 4 and 8, the phase relationship between the ac signals $A(t)$ and $B(t)$ and the associated formulae for calculation can be determined in the phase discriminator circuit N by reference to the patterns of FIGS. 4a to 4k. A counter circuit O counts the number of sampling periods between two adjacent zeroes of an ac signal, i.e. the number of sampling pulses not pertaining to the derivation of the zero point. The counter circuit O always monitors the output from the sign discriminator circuit M, adds unity to the number of sampling pulses stored therein if the output is positive, i.e. M1, and clears the number information stored therein if the output is zero or negative, i.e. M2. The interval $t_2 - t_4$ in FIG. 3, i.e., $2\Delta t$ in the formula (6), can be calculated from the number of counts of the counter O. It is needless to say here that $2\Delta t$ should be calculated before the counter O is cleared. This $2\Delta t$ corresponds to $k \cdot \Delta t$ in the step 125 of the flowchart in FIG. 8. A phase-difference calculator circuit Q calculates the phase difference between the ac signals $A(t)$ and $B(t)$ from the output of counter circuit O, the output of the phase discriminator circuit N, $A(t)$ and $B(t)$, and $A(t_n)$ and $B(t_n)$, and $A(t_{n-1})$ and $B(t_{n-1})$. Namely, the phase discriminator circuit N indicates not only the phase relationship but also the appropriate formula to calculate the phase difference $\phi$.

Consequently, on the basis of the indication by the phase discriminator circuit N, the phase difference $\phi$ between the ac signals $A(t)$ and $B(t)$ can be obtained from the instantaneous values $A(t_n)$, $A(t_{n-1})$, $B(t_{n-1})$, $B(t_n)$ which are memorized by memory K, and the output of the counter circuit O.

We claim:

1. A method of digitally processing sinusoidal ac quantities for the operation of a power system, said method comprising the steps of:

sampling at least one ac input quantity at a constant period and holding the sampled values;

converting each of the sampled and held values into a digital quantity;

storing said digital quantity;

producing, at every sampling, the product of a digital quantity corresponding to the instantly sampled value and the stored digital quantity corresponding to the value sampled at the preceding sampling;

judging whether said product is one of a negative value, a positive value and a zero value; and determining a zero point of the sinusoidal ac quantity on the basis of said two digital quantities from which said product has been obtained and the sampling period, if the result of the above judgement is one of a negative value and a zero value.

2. A method according to claim 1, which further includes additional steps of:

determining the sine of an angle equivalent to the time of the zero point relative to the sampling point; and deriving the peak value of the sinusoidal ac quantity from the value of said sine and the digital value of the quantity at the sampling point.

3. A method according to claim 1, which further includes additional steps of:

counting the number of the sampling periods contained between two adjacent zero points of the ac quantity; and determining the frequency of said ac quantity from said number of sampling periods and said two sampling points.

4. A method according to claim 1, which further includes additional steps of:

judging the one of lag and lead in phase between two sinusoidal ac quantities from the respective digital values of said two quantities taken at two sampling points; and determining the phase difference between said two ac quantities from the result of the above judgment and the respective zero points of said two ac quantities.

5. A method according to claim 4, wherein two sinusoidal ac quantities are the voltage and the current in a power transmission line and said method further includes additional steps of:

determining the sine value of one of said two ac quantities on the basis of the zero point, and one of lag and lead relation in phase and the phase difference between said two ac quantities, deriving the peak value of said one ac quantity from said sine value and the digital value of said one ac quantity, determining the sine value of the other of said two ac quantities on the basis of the zero point, the one of lag and lead relation in phase and the phase difference between said two ac quantities, deriving the peak value of said other ac quantity from the sine value thereof and the digital value of said ac quantity, and determining the ratio of the respective peak values of said ac quantities.

6. A method according to claim 4, wherein two sinusoidal ac quantities are the voltage and the current in a power transmission line and said method further includes additional steps of:

determining the sine value of one of said two ac quantities on the basis of the zero point, the one of lag and lead relation in phase and the phase difference between two ac quantities, deriving the peak value of said one ac quantity from said sine value and the digital value of said one ac quantity, determining the sine value of the other of said two ac quantities on the basis of the zero point, the one of lag and lead relation in phase and the phase difference between said two ac quantities, deriving the peak value of said other ac quantity from the sine value thereof and the digital value of said ac quantity, determining the cosine value of an angle corresponding to the phase difference between said two ac quantities, and deriving the product of said cosine value and the peak values of the respective ac quantities.

7. A method according to claim 1, wherein the step of sampling includes sampling a plurality of ac quantities.

8. Apparatus for processing sinusoidal ac signals comprising: first means for generating a timing signal for the sampling of at least one ac signal; second means for sampling each said ac signal in synchronism with said timing signal and for holding the sampled values of each said ac signal for a predetermined time; third means for generating at least first, second, third and fourth control signals in accordance with said timing signal; fourth means responsive to the first control signal for selectively passing the outputs of said second means; fifth means responsive to the second control signal for converting the output of said fourth means into a corresponding digital quantity; sixth means responsive to the third control signal for storing the output of said fifth means; seventh means responsive to the fourth control signal for receiving the output of said sixth means; said seventh means including means for providing output of the product $A(t_n) \cdot A(t_{n-1})$, $A(t_n)$ and $A(t_{n-1})$ being the sampled values of each said ac signal $A(t)$ at a certain sampling point $t_n$ and another sampling point $t_{n-1}$ earlier by one sampling period than $t_n$, respectively, sign means for providing a first output when said product is one of a negative value and a zero value, and means responsive to the first output of said sign means for determining the zero point of each said ac signal in accordance with the sampled values.

9. Apparatus according to claim 8, wherein said sign means provides a second output when said product is a positive value, and counter means responsive to the second output of said sign means for counting the number of sampling pulses occurring during the interval when the second output of said sign means continues to be positive.

10. Apparatus according to claim 8, wherein two ac signals are sampled, and said seventh means includes means for calculating the phase difference between the two ac signals in accordance with the zero point of one of the two ac signals and the zero point of the other of said two ac signals.

* * * * *